May 3, 1966 W. D. WATT, JR Re. 26,019

DRAWER PULL

Original Filed Nov. 26, 1963

INVENTOR.
William Doyle Watt Jr.
BY
ATTORNEY.

United States Patent Office

Re. 26,019
Reissued May 3, 1966

26,019
DRAWER PULL

William Doyle Watt, Jr., Grand Rapids, Mich., assignor to Keeler Brass Company, Grand Rapids, Mich.

Original No. 3,191,215, dated June 29, 1965, Ser. No. 326,052, Nov. 26, 1963. Application for reissue Aug. 9, 1965, Ser. No. 480,834
8 Claims. (Cl. 16—126)

Matter enclosed in heavy brackets [ ] appears in the original patent but forms no part of this reissue specification; matter printed in italics indicates the additions made by reissue.

This invention relates to drawer pulls and the like. The main objects of this invention are:

First, to provide a drawer pull or the like which may be quickly mounted on a drawer or other part to be manipulated, the supporting member and the handle member being retained in their assembled relation when the supporting member is in mounted position.

Second, to provide a structure having these advantages which permits a very wide variation in handle member designs.

Third, to provide a drawer pull or the like having these advantages which is attractive in appearance and may be economically produced.

Objects relating to detail and economies of the invention will appear from the description to follow. The invention is defined and pointed out in the claims. A preferred embodiment of the invention is illustrated in the accompanying drawing in which:

In the accompanying drawing the numeral 1 represents the front of a drawer or other support to which a structure embodying my invention is attached.

It will be understood that my invention is especially designed and largely used in the manner of so-called "drawer pulls" but that it might be used as a handle for manipulating some other part.

Figure 1:
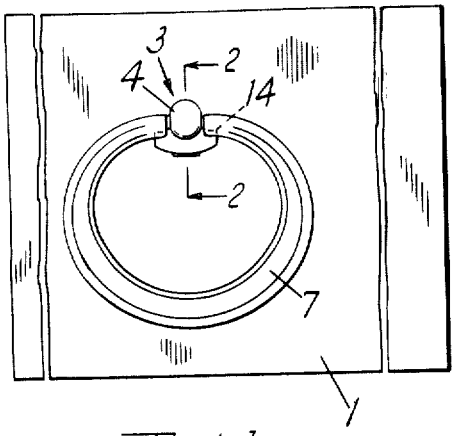
FIG. 1 is a fragmentary view of a front portion of a drawer or the like with the drawer pull of my invention attached thereto.
Figure 2:
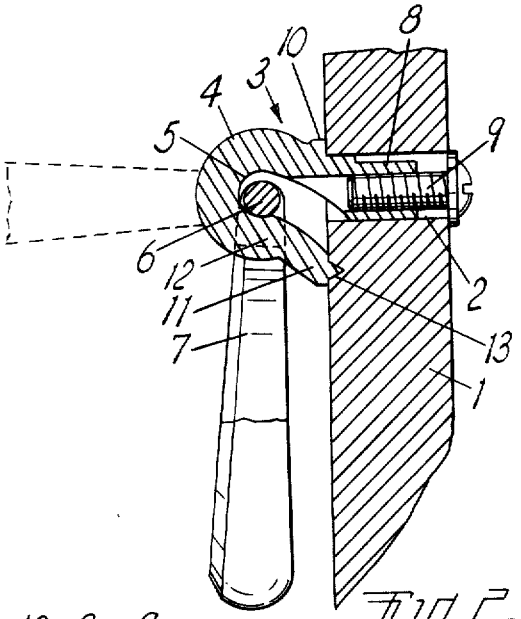
FIG. 2 is an enlarged sectional view on a line corresponding to line 2—2 of FIG. 1, the attaching screw being shown in full lines.

The drawer member 1 is provided with a bore 2. The supporting and coupling member of my invention designated generally by the numeral 3 comprises a head member 4 having an inwardly and downwardly facing slot 5 therein adapted to receive the journal 6 of a handle 7. The supporting and coupling member has an integral tubular stud portion 8 disposed within the bore 2 and internally threaded to receive the attaching screw 9. The head member of the coupling is provided with a support engaging shoulder 10 which is clamped on the outer side of the drawer or the like as is illustrated in FIG. 2.

Figure 3:
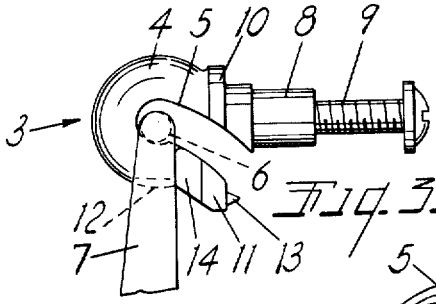
FIG. 3 is a side elevational view of the drawer pull, the handle being partially broken away.
Figure 4:
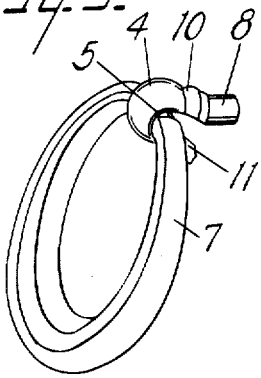
FIG. 4 is a perspective view with the attaching screw shown in FIG. 3 being omitted.
Figure 5:
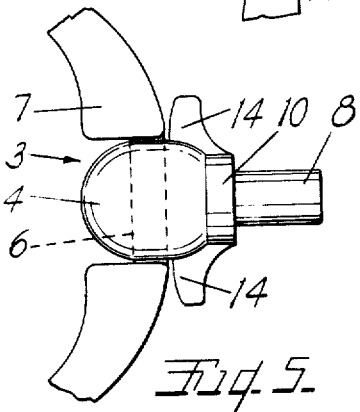
FIG. 5 is a fragmentary plan view of the embodiment of my invention shown in FIGS. 1 to 4.

The end 11 of the supporting and coupling member on the portion 12 abuts against the side of the member 1 and is desirably provided with a prong 13 which is embedded in the support member 1 and prevents rotative movement of the supporting and coupling member on the part 8 thereof disposed in the bore 2. The portion of the head member below the slot has laterally projecting stops 14 which the handle is supportedly engaged when it is in its released depending position as illustrated in FIGS. 2 and 3. This prevents the handle from contacting the face of the drawer when the handle is dropped to non use position and facilitates grasping. It avoids the necessity of providing the handle with stops, as has been quite general practice, and it materially reduces the cost of production of the handles and the packaging thereof.

It should be borne in mind that the handle illustrated is conventional in design but that in practice varies greatly in design—that primarily for ornamental purposes—and the applicant's mounting feature is adapted to receive handles greatly varying in design, the only requirement being that the journal portion is such that it may be inserted through the slot in the head portion. The handle is held in spaced relation to the surface of the member on which the handle is mounted as is illustrated in FIG. 2 and may be readily grasped and swung out to use position, as is indicated by dotted lines in FIG. 2, and when released swings downwardly into supported engagement with the stops 14.

The outer end or face of the head member is desirably spherically curved as is illustrated so that there are no irergular or projecting parts with which the hand of the user could become engaged.

Another advantage of applicant's invention is that the parts may be very economically produced and no bending or machine work is required to connect the handle in use position to the supporting and coupling member.

In assembling, the head portion of the supporting and coupling member may be grasped and slipped over the journal of the handle and then swung to the position indicated in the drawing in which the parts are in effect in interlocking position, thus facilitating the mounting thereof.

I have illustrated and described my invention in a practical embodiment thereof. I have not attempted to illustrate variations in design but, as stated, one of the advantages of the embodiment of this invention is that handles of widely varying design may be assembled with supporting and coupling members of the same design.

What is claimed as new is:

1. A drawer pull comprising an annular handle having a journal, a unitary supporting and coupling member including a head member having a spherically curved outer surface and having an inwardly and downwardly opening slot therein adapted to receive the journal of said handle, there being a bearing for said journal at the outer end of said slot, said coupling member including an inwardly projecting tubular stud adapted to be inserted in a bore of a drawer and being internally threaded to receive an attaching screw, there being a support engaging shoulder at the outer end of said stud, the portion of said head member below said slot having a support engaging abutment and a support engaging brad projecting from said abutment, the portion of said head member below said slot having laterally projecting stops with which a portion of said handle adjacent said journal is in supported engagement when the handle is in depending position thereby preventing the handle engaging a surface to which the pull is attached and facilitating the grasping of the handle, the outer end of said head member being curved.

[2. A drawer pull comprising a handle having a journal, a unitary supporting and coupling member including a head member having a spherically curved outer surface and having an inwardly opening slot therein adapted to receive the journal of said handle, there being a bearing for said journal at the outer end of said slot, said coupling member including an inwardly projecting tubular stud adapted to be inserted in a bore of a drawer and being internally threaded to receive an attaching screw, there being a support engaging shoulder at the outer end of said stud, the portion of said head member below said slot having a support engaging abutment and a support engaging brad projecting from said abutment, the portion of said head member below said slot having laterally projecting stops with which a portion of said handle adjacent said journal is in supported engagement when the handle is in depending position thereby preventing the handle engaging a surface to which the pull is attached and facilitating the grasping of the handle.]

[3. A drawer pull comprising a handle having a journal, a unitary supporting and coupling member including a head member having a spherically curved outer surface and having an inwardly opening slot therein adapted to receive the journal of said handle, there being a bearing for said journal at the outer end of said slot, said coupling member including an inwardly projecting tubular stud adapted to be inserted in a bore of a drawer and being internally threaded to receive an attaching screw, the portion of said head member below said slot having a support engaging abutment and a support engaging brad projecting from said abutment, the portion of said head member below said slot having laterally projecting stops with which a portion of said handle adjacent said journal is in supported engagement when the handle is in depending position thereby preventing the handle engaging a surface to which the pull is attached and facilitating the grasping of the handle.]

4. A drawer pull comprising a handle having a journal, a unitary supporting and coupling member including a head member having a spherically curved outer surface and having an inwardly opening slot therein adapted to receive the journal of said handle, there being a bearing for said journal at the outer end of said slot, said coupling member including an inwardly projecting tubular stud adapted to be inserted in a bore of a drawer and being internally threaded to receive an attaching screw, there being a support engaging shoulder at the outer end of said stud, the portion of said head member below said slot having a support engaging abutment, the portion of said head member below said slot having a stop with which a portion of said handle adjacent said journal is in supported engagement when the handle is in depending position thereby preventing the handle engaging a surface to which the pull is attached and facilitating the grasping of the handle.

5. A drawer pull comprising a handle having a journal, a unitary supporting and coupling member including a head member having a spherically curved outer surface and having an inwardly opening slot therein adapted to receive the journal of said handle, there being a bearing for said journal at the outer end of said slot, said coupling member including an inwardly projecting tubular stud adapted to be inserted in a bore of a drawer and being internally threaded to receive an attaching screw, the portion of said head member below said slot having a support engaging abutment, the portion of said head member below said slot having a stop with which a portion of said handle adjacent said journal is in supported engagement when the handle is in depending position thereby preventing the handle engaging a surface to which the pull is attached and facilitating the grasping of the handle.

6. A drawer pull comprising a handle having a journal, a unitary supporting and coupling member including a head member having a spherically curved outer surface and having an inwardly opening slot therein adapted to receive the journal of said handle, there being a bearing for said journal at the outer end of said slot, said coupling member including an inwardly projecting tubular stud adapted to be inserted in a bore of a drawer and being internally threaded to receive an attaching screw, the portion of said head member below said slot having a support engaging abutment, the portion of said head member below said slot having a stop with which said handle adjacent said journal is in supported engagement when the handle is in depending position thereby preventing the handle engaging a surface to which the pull is attached and facilitating the grasping of the handle.

7. A drawer pull comprising a handle having a journal, a unitary support and coupling member including a head member having a spherically curved outer surface and having an inwardly opening slot adapted to receive the journal of said handle, there being a bearing for said journal at the outer end of said slot, said coupling member including an inwardly projecting attaching portion adapted to be inserted in the bore of a drawer, the portion of said head member at the outer side of said slot having a support engaging abutment and a support engaging brad projecting from said abutment, said head member having laterally projecting stops with which said handle engages when the handle is in releasing position thereby preventing the handle from engaging a surface to which the pull is attached and facilitating the grasping of the handle.

8. A drawer pull comprising a handle having a journal, a support and coupling member including a head member having a spherically curved outer surface and having an inwardly opening slot adapted to receive the journal of said handle, there being a bearing for said journal at the outer end of said slot, said coupling member including an inwardly projecting attaching portion adapted to be inserted in the bore of a drawer, the portion of said head member at the outer side of said slot having a support engaging abutment, said head member having a stop with which said handle engages when the handle is in releasing position thereby preventing the handle from engaging a surface to which the pull is attached and facilitating the grasping of the handle.

*9. A pull for drawers comprising:*

*an annular handle having a continuous journal unitary therewith and of uniform diameter from end to end thereof,*

*a handle supporting and coupling member including a head member having an inwardly and downwardly inclined slot dimensioned to permit the lateral adjustment of a bearing portion of said handle therethrough, there being a bearing for said handle journal at an outer end of said slot,*

*said coupling member having an inwardly projecting tubular stud adapted to be inserted in a bore of a drawer and being internally threaded to receive an attaching screw, said stud having a portion adapted for fitting engagement within an end of the bore,*

*said head member having an outwardly projecting flange-like portion at its inner end abuttingly engageable with an outer side of a wall of the drawer having the bore into which said tubular stud is inserted, a portion of the said head member below said slot having laterally projecting stops with which a portion of said handle adjacent its said journal is in supported engagement when the handle is in its released depending position and which prevent the handle from engaging the surface of the drawer to which the pull is attached and which facilitates the grasping of the handle.*

*10. A pull for drawers comprising:*

*a handle having a continuous journal unitary therewith,*

*a supporting and coupling member for said handle including a head member having an inwardly and downwardly opening slot dimensioned to permit the lateral adjustment of a bearing portion of said handle therethrough, there being a bearing for said handle journal at an outer end of said slot,*

*said coupling member having an inwardly projecting attaching stud adapted to be supported inserted in an opening provided therefor in a drawer, said head member having a radial portion at its inner end abuttingly engageable with an outer side of a wall of the drawer having an opening in which said attaching stud is inserted, a portion of the said head member below said slot having a stop with which a portion of said handle adjacent its said journal*

*is in supported engagement when the handle is in its released position and which prevents the handle from engaging the surface of the drawer to which the pull is attached and which facilitates the grasping of the handle.*

References Cited by the Examiner

The following references, cited by the Examiner, are of record in the patented file of this patent or the original patent.

UNITED STATES PATENTS

| | | | |
|---|---|---|---|
| 980,193 | 1/1911 | Brenia | 16—126 |
| 1,622,735 | 3/1927 | Noelting et al. | 16—126 |
| 1,772,371 | 9/1930 | Specht | 16—127 |
| 2,177,554 | 10/1939 | Stiff | 16—126 X |

EDWARD C. ALLEN, *Primary Examiner.*

JOSEPH D. SEERS, PATRICK A. CLIFFORD, *Examiners.*

P. TEITELBAUM, *Assistant Examiner.*